United States Patent [19]
Oshita et al.

[11] Patent Number: 5,020,617
[45] Date of Patent: Jun. 4, 1991

[54] METHOD AND APPARATUS FOR CHECKING TORQUE SENSOR IN ELECTRIC POWER STEERING SYSTEM FOR VEHICLE

[75] Inventors: Saiichiro Oshita; Toyohiko Mouri; Tsutomu Takahashi, all of Tokyo, Japan

[73] Assignee: Fuji Jukogyo Kabushiki Kaisha, Tokyo, Japan

[21] Appl. No.: 324,672

[22] Filed: Mar. 17, 1989

[30] Foreign Application Priority Data

Mar. 25, 1988 [JP] Japan .................................. 63-71231

[51] Int. Cl.⁵ ............................................ B62D 5/04
[52] U.S. Cl. ...................................... 180/79.1; 180/142
[58] Field of Search ..................... 180/79.1, 142, 143, 180/141; 364/424.01, 424.05

[56] References Cited

U.S. PATENT DOCUMENTS 4,834,201  5/1989  Miyazaki et al. .................. 180/79.1

Primary Examiner—Andres Kashnikow
Assistant Examiner—Richard Camby
Attorney, Agent, or Firm—Beveridge, DeGrandi & Weilacher

[57] ABSTRACT

A method for detecting abnormal condition of a torque sensor in an electric power steering system in which a power of an electric motor assisting steering operation of a vehicle is supplied in response to a torque signal generated from the torque sensor, the method comprising the steps of detecting a condition where the torque signal generated from the torque sensor is substantially equal to zero, detecting another condition wherein the rate of changing steering angle is larger than a predetermined value, while the steering angle is held in an increasing state, and further detecting that the above detected conditions last more than a predetermined period.

5 Claims, 4 Drawing Sheets

METHOD AND APPARATUS FOR CHECKING TORQUE SENSOR IN ELECTRIC POWER STEERING SYSTEM FOR VEHICLE

BACKGROUND OF THE INVENTION

This invention relates to a method for checking a torque sensor used in an electric power steering system for a motor vehicle.

There has been known an electric power steering system for a motor vehicle in which a current flowing through an assist motor is controlled according to a torsion torque applied to a steering shaft, and the steering operation is assisted by the assist motor. For instance, in copending patent application now laid-open Patent No. 98670/1986, there is disclosed an electric power steering system wherein an assist signal is generated in response to the output signal of a torsion torque sensor while a return signal is generated in response to the output of a steering angle sensor. The return signal multiplied by a constant is added to the assist signal for reducing the output torque of the steering motor.

In the conventional electric power steering system described above, troubles by an excessive torque signal or an extremely small torque signal may occur in the torque sensor. The excessive torque signal increases the power assist, causing over steering, while the extremely small torque signal entails so-called heavy steering. The former trouble of the torque sensor can be easily detected by a frequent check whether the magnitude of the signal is in an allowable range or not. However, the detection of the later-mentioned trouble is not easy, particularly when the torque signal is near zero, because such a trouble cannot be discriminated from normal conditions that the steering wheel is not rotated so that no torque is applied to the steering shaft. There has been no simple detecting method of this kind of trouble, and therefore presumption was a common practice to find out this kind of trouble from the heavy steering condition described above.

SUMMARY OF THE INVENTION

An object of the present invention is to provide a method for detecting an abnormal condition of the torque sensor used in an electric power steering system for a motor vehicle, wherein abnormality of torsion torque signals can be detected by monitoring relationship between a torque signal generated from the torque sensor and an output signal of a steering angle sensor.

According to the present invention, there is provided a method for detecting abnormality of a torque sensor in an electric power steering system in which power of an electric motor for assisting steering operation of a vehicle is controlled in dependency on a torque signal generated from the torque sensor, the method comprising the steps of detecting whether the torque signal generated from the torque sensor is substantially equal to zero, sensing whether a rate of steering angle changing is larger than a predetermined value while the steering angle is in an increasing state, determining whether the steering angle continues to increase for a predetermined period; and displaying results of abnormality of the torque sensor.

The other objects and features of this invention will become understood from the following description with reference to the accompanying drawings.

DESCRIPTION OF THE PREFERRED EMBODIMENT

Figure 1:
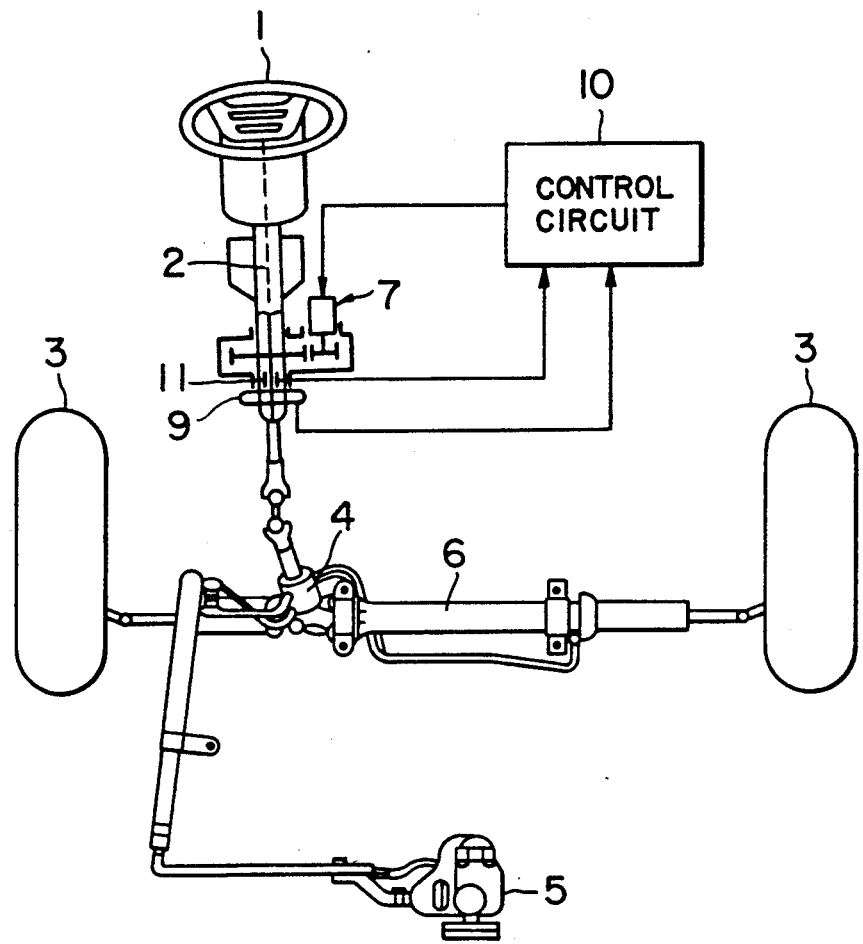
FIG. 1 is a diagrammatic illustration of a hydraulic power steering system embodying the principles of the invention.

Before entering the description of the present invention, a basic construction of the conventional power steering system will be described more in detail. Referring to FIG. 1, reference numeral 1 represents a steering wheel connected to a steering shaft 2 for steering front wheels 3. The steering shaft 2 is rotatably connected to the front wheels 3 via a steering control valve 4 and a power cylinder 6. The control valve 4 serves as a torque sensor, being controllably actuated by the torsional torque applied to the steering shaft 2 from the steering wheel 1. So actuated, the control valve 4 provide hydraulic fluid from a pump 5 into chamber of the power cylinder 6.

The steering shaft 2 is additionally provided with an electric motor 7. The motor 7 controls amount of assist torque to the steering shaft 2. A steering angle sensor 9 is mounted to the steering shaft 2 for sensing rotation angle of the steering wheel 1. A control circuit 10 is connected to the motor 7 and the steering angle sensor 9. A torque sensor 11 is mounted around the steering shaft 2 to detect torsion torque of the steering shaft 2 of a motor vehicle for generating a torque signal.

The system comprises the torque sensor 11, which detects torsion torque of the steering shaft 2 of a motor vehicle for generating a torque signal. The system further comprises an assist torque commanding section in response to the torque signal generated from the torque sensor 11, for providing a command signal i to a control circuit 10 so that a power assisting operation of the steering system is accomplished.

More practically, based on the torque signal obtained by slight turning the steering wheel of the vehicle to the left or right, the steering direction at that time is judged and determining the direction of the current to be supplied to an electric motor of the power steering system. When the steering wheel is further rotated, the torque signal generated from the torque sensor exceeds a predetermined level. Then the control circuit starts to control the electric motor for assisting the turning operation of the steering wheel in accordance with the commanding signal i.

On the other hand, in order to compensate resistance force such as inertia of the electric motor and friction of a speed-reduction mechanism, and in order to improve the returning characteristics of the power steering system, the system further comprises another control unit for reducing the assist torque to exclude the force which act reversely to the rotation of the steering wheel. The control unit comprises the steering angle sensor 9 for sensing steering angle of the steering wheel a return torque commanding section and a multiplying factor setting section, in addition to assist torque commanding section. The return torque commanding section receives the steering angle generated from the steering angle sensor, and produces a commanding signal $i\theta$ for determining a reverse running motor current. The multiplying factor setting section generates a multiplying factor signal k which is multiplied to the commanding signal $i\theta$ for varying the amount of the product $ki\theta$. In the conventional power steering system, the multiplying factor signal k and the commanding signal $i\theta$ are added to the command signal i, so that the sum is used for controlling the power assisting electric motor.

According to the present invention, the torque signal of the torque sensor 11 is judged abnormal in spite of that the torque signal from the torque sensor 11 becomes nearly zero, when the variation speed rate of the steering angle (angle of the steering wheel) is more than a predetermined value, and the steering angle is increasing state for a predetermined time, for instance, the predetermined value is 30° per second, and predetermined time is more than 0.2 second.

Figure 2:
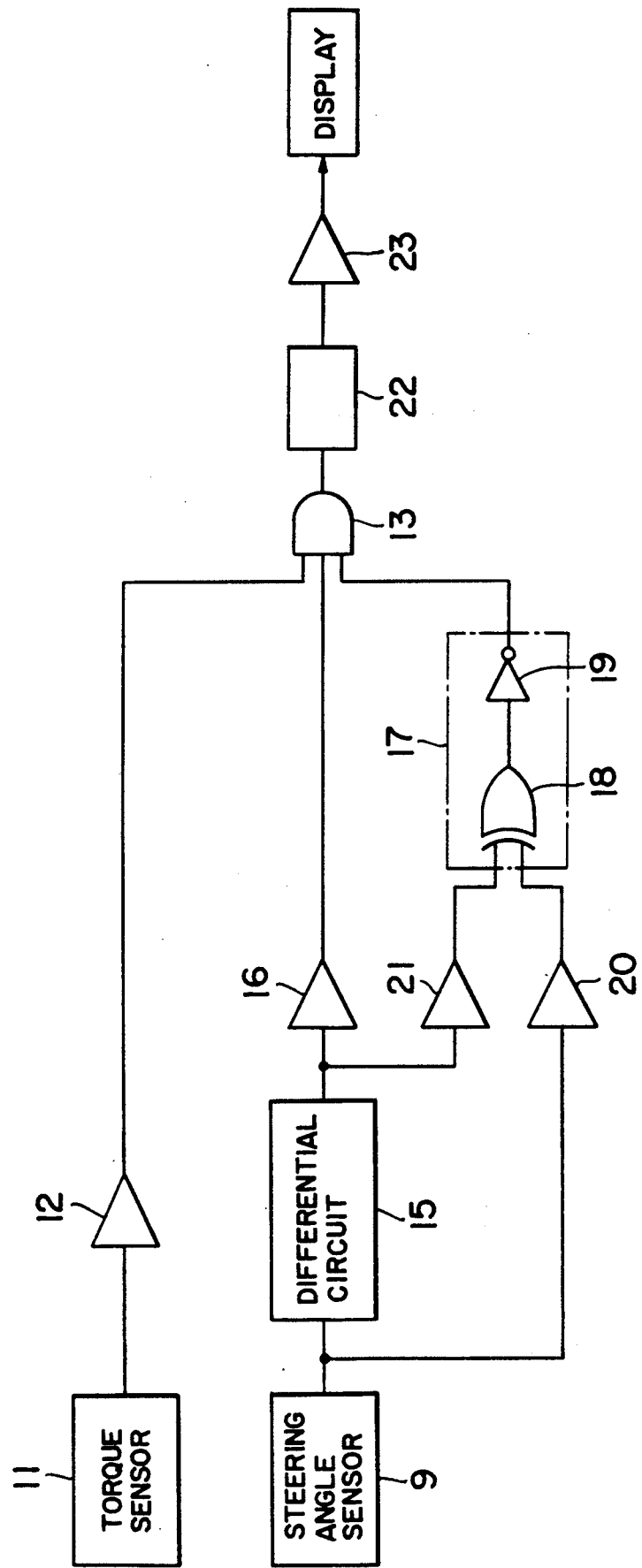
FIG. 2 is a block diagram for executing the abnormal condition detecting method of the present invention.

FIG. 2 illustrates an electric circuit for judging the abnormal condition of the torque sensor 11 in a case where the torque sensor 11 produces the torque signal of substantially equal to zero.

In the electric circuit, as shown in FIG. 2 the torsion torque of the steering shaft is detected by a torque sensor 11, and the output signal from the torque sensor 11 is applied through a comparator 12 to an input terminal of an AND gate 13. On the other hand, a steering angle sensor 9 detects the steering angle, the variation speed of the steering angle being calculated by a differential circuit 15. The output of the differential circuit 15 is applied through another comparator 16 to another input terminal of the AND gate 13.

Numeral 17 designates a steering signal generating circuit comprising an exclusive OR gate 18 and a NOT gate 19. To a first input terminal of the exclusive OR gate 18 is applied the output signal of the steering angle sensor 9 through a comparator 20, while the output signal of the differential circuit 15 is applied to a second input terminal of the exclusive OR gate 18 through another comparator 21. The steering signal generating circuit 17 produce a logic "1" to another input terminal of the AND gate 13 when the variation of the steering angle is increasing.

The output of the AND gate 13 is applied to an integrating circuit 22, and when the output of the integrating circuit 22 is more than a predetermined value defined by the comparator 23, the output signal of the torque sensor 11 is judged to be abnormal.

Figure 3:
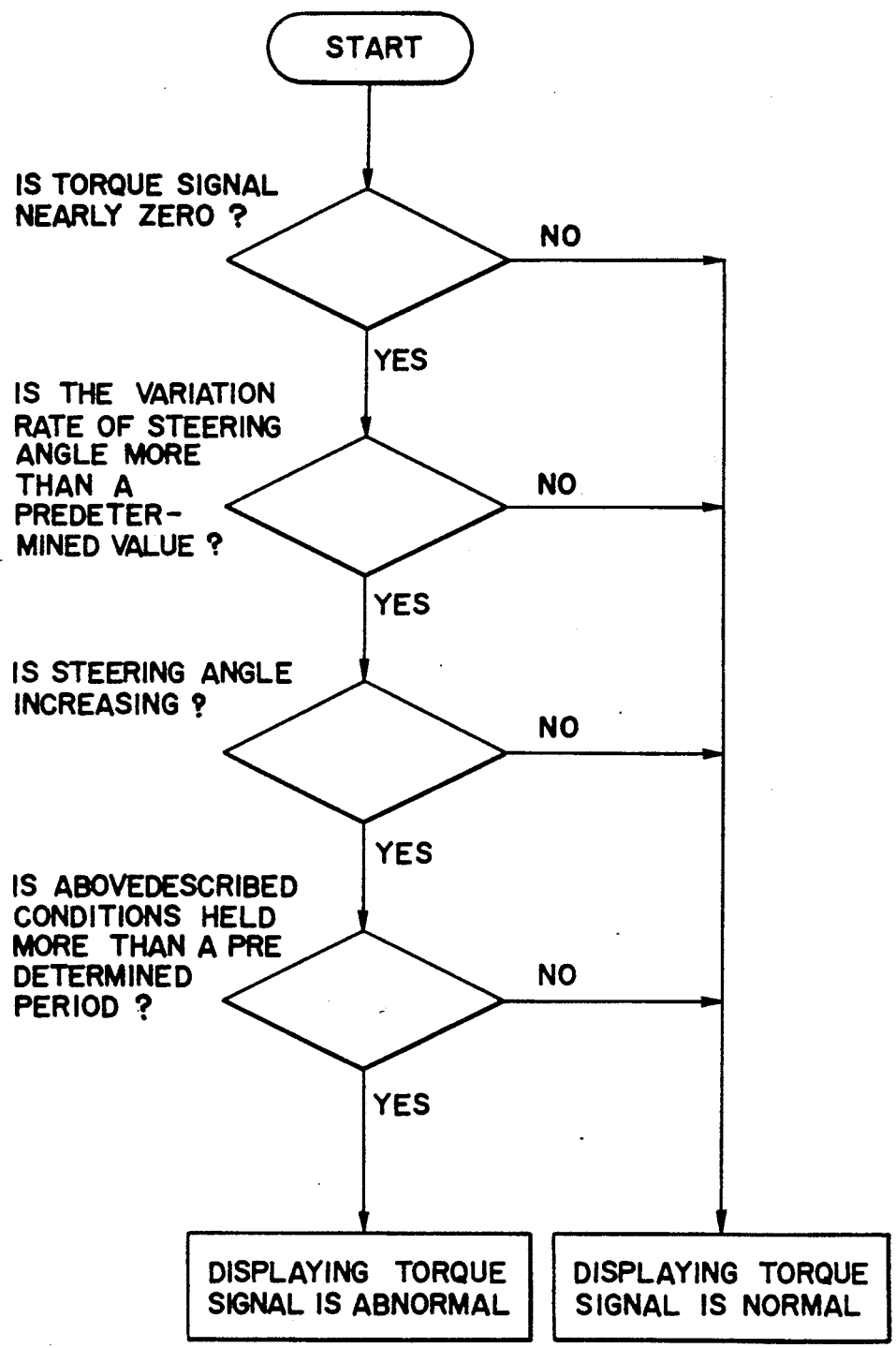
FIG. 3 is a flow chart for illustrating abnormal condition detecting steps according to this invention.

FIG. 3 illustrates a flow chart showing for detecting abnormal condition of the torque sensor. At the first step of the flow chart, whether the torque signal from the torque sensor 11 is substantially equal to zero or not is determined. When YES is determined the operation is shifted to the second step, in which whether the variation rate of the steering angle is more than, a predetermined value or not is decided. If YES is decided the operation is shifted to the third step, in which whether the variation of the steering angle is in an increasing direction or not is determined. When the result is again YES, the operation is shifted to the fourth step, in which whether the conditions continues for the predetermined time is judged. When the result is also YES, the torque sensor 11 is judged to be abnormal. However, when the result at any steps is found to be NO, the torque sensor is judged to be normal.

Figure 4:
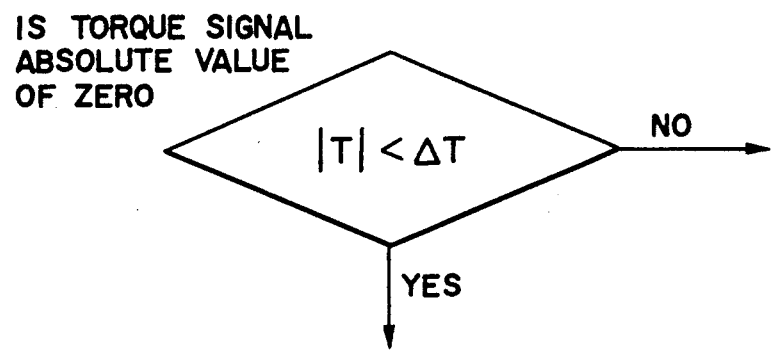
FIG. 4 is a partial flow chart for detecting that the torque signal is held to be smaller than a predetermined value.
Figure 5:
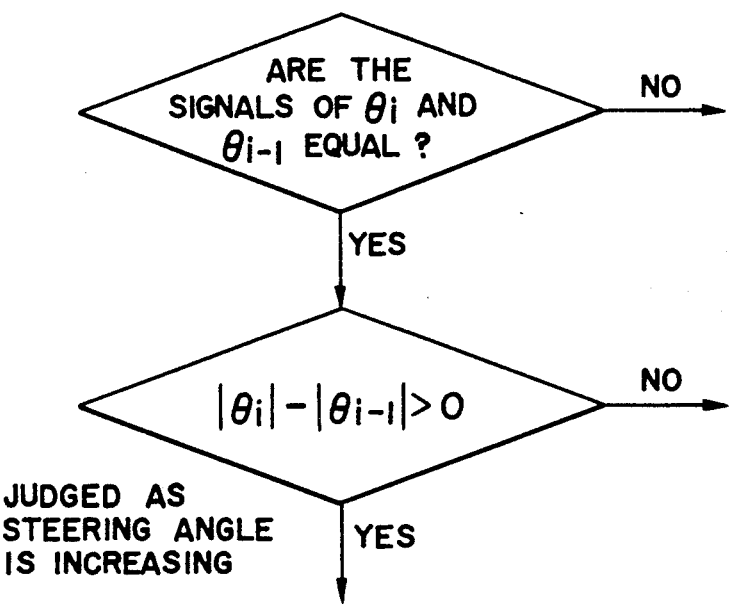
FIG. 5 is a partial flow chart detecting that the variation of the steering angle is in an increasing direction.

In the above described operation steps, the discrimination of whether the torque signal is zero or not is carried out as shown in FIG. 4 wherein the absolute value $|T|$ of the torque signal T detected at every predetermined time interval is less than a predetermined value $\Delta T$ of, for instance, 0.06 kgf·m is checked. On the other hand, the discrimination of whether the variation of the steering angle is in the increasing direction or not is carried out as shown in FIG. 5 wherein whether the presently detected steering angle $\theta i$ and the previously detected steering angle $\theta i-1$ are of the same polarity or not is firstly checked, and then whether the absolute value $|\theta i|$ is larger than the absolute value $|\theta i-1|$ or not is discriminated.

Although in the above description, an example where the torque signal and the steering angle signal are expressed digitally described, it becomes apparent that the invention may also be applied to the case where these signals are analog values.

According to the present invention, abnormality of the torsion torque sensor can be precisely detected even though there is no torque signal from the sensor while no operation of the steering wheel.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for checking a torque sensor of an electric power steering system having an electric motor provided to generate an assisting power in response to a torque signal generated from the torque sensor, the method comprising the steps of:

generating a detection signal when the torque signal is substantially equal to zero;

producing a decision signal when a rate of changing steering angle is larger than a predetermined value;

outputting a judgment signal when the steering angle is increasing; and determining an abnormality of the torque sensor in response to the detection signal, decision signal and judgment signal.

2. The method according to claim 1, wherein said abnormality is a state of generating substantially no torque signal from said torque sensor.

3. The method according to claim 1, further comprising the step of:

displaying results of said abnormality.

4. The method according to claim 3, wherein said abnormality is detected and displayed in a digit.

5. The method according to claim 3, wherein said abnormality is detected and displayed in an analog system.

* * * * *